(12) United States Patent  
Onda et al.

(10) Patent No.: US 8,468,232 B2  
(45) Date of Patent: Jun. 18, 2013

(54) SERVICE PROCESSING APPARATUS, SERVICE PROCESSING SYSTEM AND COMPUTER READABLE MEDIUM

(75) Inventors: Masanori Onda, Kanagawa (JP); Ryoko Usuba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 224 days.

(21) Appl. No.: 13/103,537

(22) Filed: May 9, 2011

(65) Prior Publication Data

US 2012/0124187 A1 May 17, 2012

(30) Foreign Application Priority Data

Nov. 12, 2010 (JP) ................................ 2010-254223

(51) Int. Cl.  
*G06F 15/173* (2006.01)

(52) U.S. Cl.  
USPC .......................................................... 709/223

(58) Field of Classification Search  
USPC ........................................ 709/220, 223, 225  
See application file for complete search history.

(56) References Cited

U.S. PATENT DOCUMENTS 7,519,711 B2* 4/2009 Mohindra et al. ............. 709/226  
7,903,677 B2* 3/2011 Yasuda et al. ................. 370/404  
2007/0165659 A1* 7/2007 Yasuda et al. ................. 370/404  
2009/0007097 A1* 1/2009 Hinton et al. .................. 717/176  
2011/0320599 A1* 12/2011 Matsumoto et al. ........... 709/225

FOREIGN PATENT DOCUMENTS

| JP | 09-244979 A | 9/1997 |
| JP | 2002-099521 A | 4/2002 |
| JP | 2004-038972 A | 2/2004 |
| JP | 2007-140952 A | 6/2007 |

* cited by examiner

*Primary Examiner* — Jason Recek  
(74) *Attorney, Agent, or Firm* — Sughrue Mion, PLLC

(57) ABSTRACT

A service processing apparatus includes: a receiving unit that receives a service processing request; a first acquiring unit that acquires service configuration information; a second acquiring unit that acquires processing ability management information; a processing unit that processes the service using the installed module; and a selecting unit that selects service processing apparatuses. The service processing apparatus includes a determining unit that determines a service processing apparatus having the minimal processing load resulting from the calculation of the processing load as a request destination for a processing using the module which is installed on neither the service processing apparatus nor the different service processing apparatuses; and an installation unit that installs the module on the service processing apparatus determined by the determining unit if the module which is installed on neither the service processing apparatus nor the different service processing apparatuses is not installed on the determined service processing apparatus.

6 Claims, 11 Drawing Sheets

FIG. 4

EXEMPLARY DATA CONFIGURATION OF SERVICE CONFIGURATION INFORMATION

| SERVICE NAME | MODULE NAME | | | | | | | | |
|---|---|---|---|---|---|---|---|---|---|
| | A | B | C | D | E | F | ... | J | K |
| SV1 | 1 | — | — | — | — | — | | — | — |
| SV2 | 1 | 2 | 3 | — | — | — | | — | — |
| SV3 | — | — | 1 | — | — | — | | — | — |
| SV4 | — | — | 1 | — | 3 | 2 | | — | — |
| SV5 | — | 1 | — | 2 | 3 | 4 | | — | — |

FIG. 5

EXEMPLARY DATA CONFIGURATION OF PROCESSING ABILITY MANAGEMENT INFORMATION

| IMAGE PROCESSING APPARATUS | EMPTY CAPACITY | PROCESSING ABILITY | INSTALLED MODULE |
|---|---|---|---|
| $\alpha$ | 30 | 50 | A |
| $\beta$ | 50 | 50 | B |
| $\gamma$ | 100 | 70 | — |
| $\delta$ | 20 | 100 | — |

FIG. 6

EXEMPLARY DATA CONFIGURATION OF MODULE MANAGEMENT INFORMATION

| MODULE NAME | PROGRAM CAPACITY | COMPUTATION AMOUNT | INSTALLATION DESTINATION IMAGE PROCESSING APPARATUS | STORAGE DESTINATION INFORMATION |
|---|---|---|---|---|
| A | 10 | 5 | $\alpha$ | http://1.4.7.9/basic/ |
| B | 20 | 10 | $\beta$ | http://1.4.7.10/basic/ |
| C | 40 | 50 | — | http://5.6.7.8/optional/ |
| D | 10 | 100 | — | http://5.6.7.12/basic/ |
| E | 50 | 10 | — | http://5.6.7.13/expert/ |

FIG. 7

EXEMPLARY DATA CONFIGURATION OF EXECUTION COST INFORMATION

|   | A   | B   | C   |
|---|-----|-----|-----|
| α | 1.0 | 1.0 | 1.0 |
| β | 1.0 | 1.0 | 1.0 |
| γ | 0.7 | 0.7 | 0.7 |
| δ | 0.5 | 0.5 | 0.5 |

FIG. 8

EXEMPLARY DATA CONFIGURATION OF COMMUNICATION COST INFORMATION

| from \ to | α | β | γ | δ |
|-----------|---|---|---|---|
| α | 0 | 1 | 1 | 1 |
| β | 1 | 0 | 1 | 1 |
| γ | 1 | 1 | 0 | 1 |
| δ | 1 | 1 | 1 | 0 |

FIG. 11A   EXECUTION COST CALCULATION FUNCTION FOR COLOR IMAGE

|   | A | B | C |
|---|---|---|---|
| α | func_col_αA | func_col_αB | func_col_αC |
| β | func_col_βA | func_col_βB | func_col_βC |
| γ | func_col_γA | func_col_γB | func_col_γC |
| δ | func_col_δA | func_col_δB | func_col_δC |

FIG. 11B   EXECUTION COST CALCULATION FUNCTION FOR MONOCHROME IMAGE

|   | A | B | C |
|---|---|---|---|
| α | func_bw_αA | func_bw_αB | func_bw_αC |
| β | func_bw_βA | func_bw_βB | func_bw_βC |
| γ | func_bw_γA | func_bw_γB | func_bw_γC |
| δ | func_bw_δA | func_bw_δB | func_bw_δC |

— # SERVICE PROCESSING APPARATUS, SERVICE PROCESSING SYSTEM AND COMPUTER READABLE MEDIUM

CROSS-REFERENCE TO RELATED APPLICATION

This application is based on and claims priority under 35 USC 119 from Japanese Patent Application No. 2010-254223 filed on Nov. 12, 2010.

BACKGROUND

1. Technical Field

This invention relates to a service processing apparatus and a service processing system and computer readable medium.

2. Related Art

Techniques for processing data in association with data processing apparatuses which may be mutually communicated via a network have been known in the art.

SUMMARY

According to an aspect of the invention, a service processing apparatus includes:

a receiving unit that receives a service processing request;

a first acquiring unit that acquires service configuration information including at least information identifying one or more modules to implement one or more processing functions required to process a requested service;

a second acquiring unit that acquires processing ability management information including at least information identifying an installed module and information indicating processing ability for own service processing apparatus and each of one or more different service processing apparatuses which is operated in association with the own service processing apparatus when the service is processed;

a processing unit that processes the service using the installed module;

a selecting unit that selects service processing apparatuses on which is installed a module which is installed on neither the own service processing apparatus nor the different service processing apparatuses by referring to the processing ability management information if there exists a module which is installed on neither the own service processing apparatus nor the different service processing apparatuses among modules used when the requested service is processed by referring to the service configuration information;

a determining unit that selects services using the module which is installed on neither the own service processing apparatus nor the different service processing apparatuses by referring to the service configuration information, narrowing a range of the selected services to a service which is a calculation object of a processing load depending on conditions of installation of the module used to process each of the selected services within the service processing apparatus and the different service processing apparatuses, that calculates a processing load when the module which is installed on neither the service processing apparatus nor the different service processing apparatuses is installed on each of the service processing apparatuses selected by the selecting unit when the narrowed service is processed, and that determines a service processing apparatus having the minimal processing load resulting from the calculation of the processing load as a request destination for a processing using the module which is installed on neither the service processing apparatus nor the different service processing apparatuses; and an installation unit that installs the module on the service processing apparatus determined by the determining unit if the module which is installed on neither the service processing apparatus nor the different service processing apparatuses is not installed on the determined service processing apparatus, and updates the processing ability management information by setting information identifying a module installed on the determined service processing apparatus.

BRIEF DESCRIPTION OF THE DRAWINGS

Exemplary embodiments of the invention will be described in detail based on the following figures, wherein:

FIG. 4 is a view showing an exemplary data configuration of service configuration information according to the first exemplary embodiment;

FIG. 5 is a view showing an exemplary data configuration of processing ability management information according to the first exemplary embodiment;

FIG. 6 is a view showing an exemplary data configuration of module management information according to the first exemplary embodiment;

FIG. 7 is a view showing an exemplary data configuration of execution cost information according to the first exemplary embodiment;

FIG. 8 is a view showing an exemplary data configuration of communication cost information according to the first exemplary embodiment;

FIGS. 11A and 11B are views showing management tables which manage a prepared execution cost calculation function for each of image data according to the first exemplary embodiment;

DETAILED DESCRIPTION

Hereinafter, preferred exemplary embodiments of the invention will be described with reference to the drawings.

First Exemplary Embodiment

Figure 1:
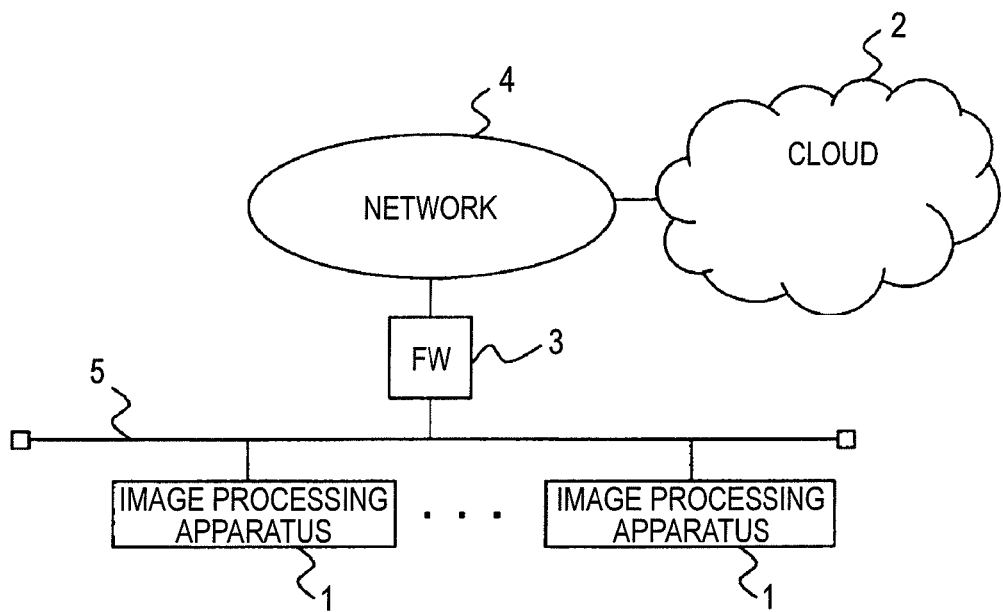
FIG. 1 is a view showing a general configuration of a service processing system according to one exemplary embodiment of the invention.

FIG. 1 is a view showing a general configuration of a service processing system according to one exemplary embodiment of the invention. FIG. 1 shows a configuration where a plurality of image processing apparatuses 1 are connected to a cloud 2 via a firewall (FW) 3 and a network 4. Each image processing apparatus 1 is one type of data processing apparatus which mainly deals with image data and is shown as one example of a service processing apparatus of the invention. In this exemplary embodiment, each image processing apparatus 1 is an apparatus having various functions such as scanning, printing and the like and itself performs all or some of the processing functions to be executed when a received service is provided or requests a different image processing apparatus 1 to perform such processing functions. The cloud 2, being an abbreviation of 'cloud computing,' downloads a module, which is to be used when a service is offered at a download request from a specified image processing apparatus 1, to the given image processing apparatus 1. The cloud 2 includes plural of servers and the like (not shown) on which modules are installed. An image processing apparatus 1 may communicate with different image processing apparatuses 1 via a network 5. Preferably, the network 5 is a network such as an intranet to allow secure communication without being limited thereto. The network 4 is considered to be the Internet in that it is considered to access a general commercial cloud service, without being limited thereto. Each of the networks 4 and 5 is configured to be single for the sake of convenience but, as long as the image processing apparatuses 1 may access the cloud 2, the form of connection of the network 4 is not limited to the example shown in FIG. 1.

A "module" used herein refers generally to a part such as logically separable software (computer program), hardware, and the like. Accordingly, a module in this exemplary embodiment includes not only a module in a computer program but also a module in hardware configuration. However, as will apparent from the following description, in this exemplary embodiment, a module used when a service is processed is obtained by downloading from the cloud 2. That is, this exemplary embodiment is illustrated with a module in a computer program. Although the module is in one-to-one correspondence with a function, for mounting, one module may be configured as one program, plural of modules may be configured as one program, or one module may be configured as plural of programs.

A "service" used herein means any information processing functions provided by software or hardware. One or more processing functions required to process a service are implemented using one or more modules (as either software parts or hardware parts). For mounting, one service is configured by one or more modules. In this exemplary embodiment, execution of one or more processing functions by one or more modules for processing a service is called "service processing execution."

Figure 2:
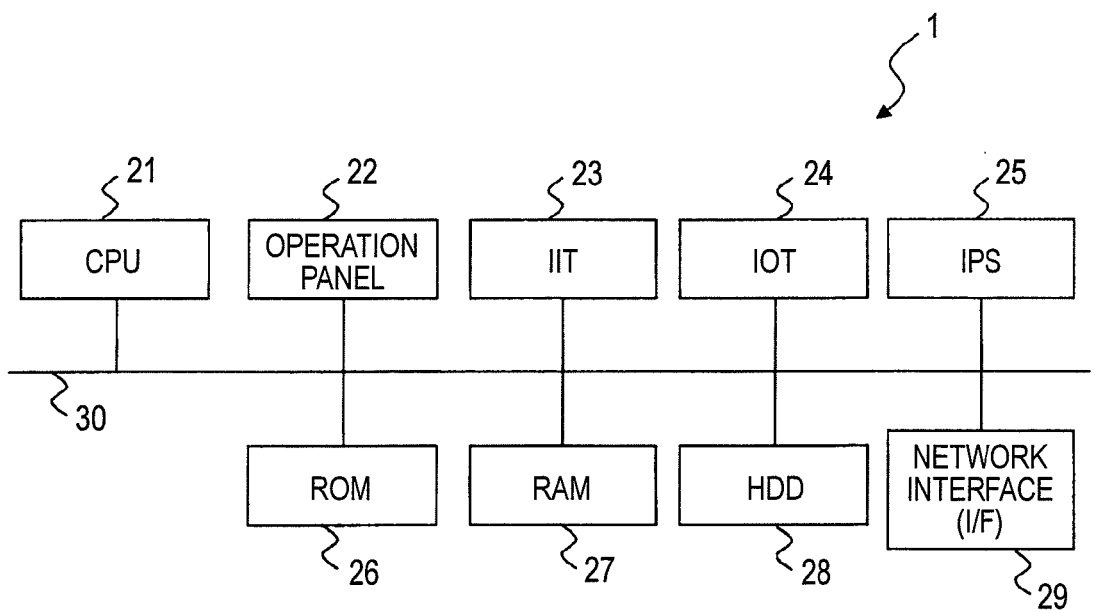
FIG. 2 is a view showing an exemplary hardware configuration of an image processing apparatus according to a first exemplary embodiment.

FIG. 2 is a view showing an exemplary hardware configuration of an image processing apparatus 1 in this exemplary embodiment. The image processing apparatus 1 is loaded with the above-described various kinds of functions and is installed on a computer. In FIG. 2, a CPU 21 controls the operation of various mechanisms, such as an image input terminal (IIT) 23, an image output terminal (IOT) 24 and the like, mounted within the apparatus according to a program stored in a ROM 26. The IIT 23, which refers to an image input device, reads a document set by a user and stores the read document, as electronic data, in a hard disk drive (HDD) 28 or the like. The IIT 23 may be implemented by, for example, a scanner. The IOT 24, which refers to an image output device, prints an output paper with an image according to an instruction from a control program executed by the CPU 21. The IOT 24 may be implemented by, for example, a printer. An address data bus 30 is connected to various mechanisms to be controlled by the CPU 21 for data communication. An operation panel 22 receives an instruction from a user and displays information. In this exemplary embodiment, the content of a service is set according to an input from the operation panel 22 and a service processing request is issued according to a given operation. An image processing system (IPS) 25, which refers to an image processing unit, executes an image processing if the service including the image processing is included in a received service. The read only memory (ROM) 26 stores various programs relating to controls and services of the apparatus. Execution of such various programs enables the respective predetermined processing functions of the respective elements, which will be described later. A random access memory (RAM) 27 is used as a work memory for program execution or a communication buffer for electronic data exchange. The HDD 28 stores electronic documents and the like read using the IIT 23. A network interface (I/F) 29 is connected to the network and is used for transmission of a download request or execution request of a module from the apparatus, reception of a downloaded module, access to the apparatus via a browser, and the like. In this exemplary embodiment, the network interface 29 is used for information exchange between the network interface and different image processing apparatus 1 or the cloud 2.

Figure 3:
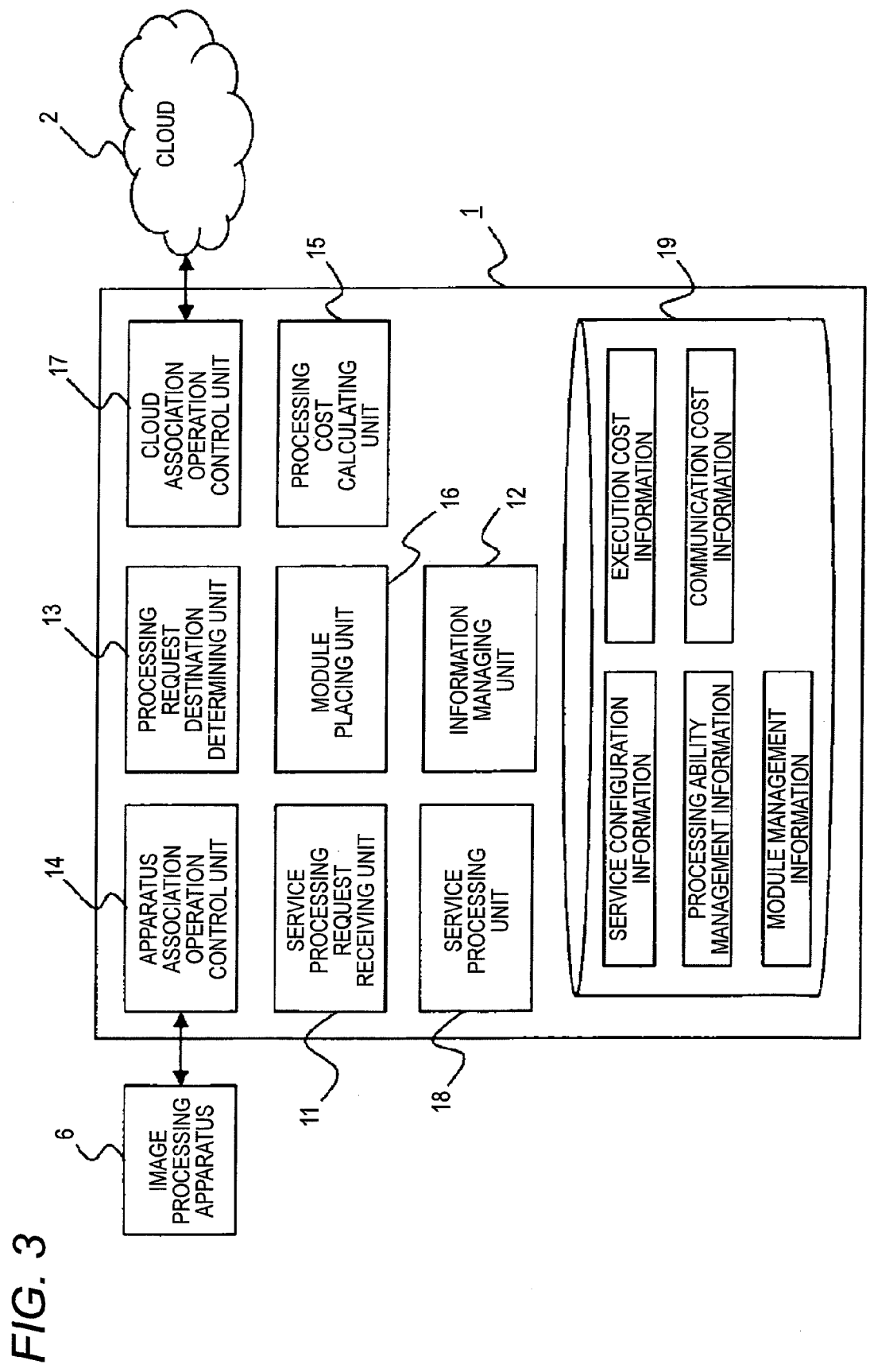
FIG. 3 is a block diagram showing a configuration of the image processing apparatus according to the first exemplary embodiment.

FIG. 3 is a block diagram showing a configuration of the image processing apparatus 1 in this exemplary embodiment. In FIG. 3, an image processing apparatus 6 has the same configuration as the image processing apparatus 1 but is denoted by a different reference numeral in order to clarify that the image processing apparatus 6 is a "different" image processing apparatus operated in association with the image processing apparatus 1. In this figure, a single representative image processing apparatus 6 is shown as the representative one although the number of different image processing apparatuses 6 operated in association with the image processing apparatus 1 is one or more.

In this exemplary embodiment, the image processing apparatus 1 includes a service processing request receiving unit 11, an information managing unit 12, a processing request destination determining unit 13, an apparatus association operation control unit 14, a processing cost calculating unit 15, a module placing unit 16, a cloud association operation control unit 17, a service processing unit 18 and an information storing unit 19.

The service processing request receiving unit 11 receives a service execution request to request the image processing apparatus 1 to process a service. The service execution request (also referred to as "service processing request") is generated by a user selecting a desired service through the operation panel 22 of the image processing apparatus 1 or is transmitted from a client computer (not shown) via the network 4 or the network 5.

The information managing unit 12 manages a variety of information stored in the information storing unit 19. Examples of the information may include service configuration information, processing ability management information, module management information, execution cost information, communication cost information and the like, which will be described later. In addition, information required for processing to be described later, such as the speed of data communication between image processing apparatuses, is managed using the information storing unit 19. The information relating to the data communication speed may have a preset value or a value measured using a technique disclosed in JP-A-2004-38972.

The processing request destination determining unit 13 specifies the image processing apparatuses 1 and 6 with a module, used to process a service received by the service processing request receiving unit 11, installed thereon by referring to information managed by the information managing unit 12. Among the modules required to execute a service processing, if there exists a module which is installed on neither the image processing apparatus 1 nor the image processing apparatus 6, an image processing apparatus that is made startable by downloading a module by a module placing unit 16 described later is confirmed as the processing request destination of the module.

The apparatus association operation control unit 14 executes a processing request or module download to the different image processing apparatus 6 connected to the network 5. The term "processing request" used herein refers to a processing request of a service itself received by the service processing request receiving unit 11, or a portion of the received service using a module which is not installed on the image processing apparatus 1 among modules required to process the received service, that is, a processing request for that module. In addition, the apparatus association operation control unit 14 receives a processing request or a module download request from the image processing apparatus 6.

The processing cost calculating unit 15 calculates a processing cost by referring to cost-related information managed by the information managing unit 12. The term "cost-related information" used herein refers to execution cost information and communication cost information. The processing cost is calculated as the sum of the module execution cost calculated on the basis of an amount of computation for each of the modules constituting the service received by the service processing request receiving unit 11 and the communication cost calculated on the basis of the speed of data communication between image processing apparatuses (in this case, between the image processing apparatus 1 and the image processing apparatus 6). In this exemplary embodiment, it is noted that the term "cost" may be replaced with the term "load."

Here, the data communication speed is considered because, in a service providing a function by processing plural of modules sequentially, the plurality of modules constituting the service is required to be executed in a given order and, if the plurality of modules constituting the service is likely to be distributed over plural of image processing apparatuses, the result of processing by one module is required to be transmitted to a different image processing apparatus via the network. Accordingly, when a service is constituted by plural of modules and these modules are distributed over plural of image processing apparatuses, the communication cost is required to be calculated taking into consideration the communication path between the modules. Moreover, the specific calculation of the processing cost will be described hereinafter.

The module placing unit 16 is required to satisfy specific conditions (which will be described later) and process the service received by the service processing request receiving unit 11. In addition, for an image processing apparatus (in this exemplary embodiment, the image processing apparatus 1 or the image processing apparatus 6, or both) which is able to allocate a module which is not installed on the image processing apparatus 1, the module placing unit 16 enables the image processing apparatus to use the module by downloading the module from the cloud 2 or the like. If there exist plural of image processing apparatuses which is able to allocate the module required, an image processing apparatus with the minimum of processing costs as calculated by the processing cost calculating unit 15 is confirmed.

The cloud association operation control unit 17 implements a function to download a required module from the cloud 2. In this exemplary embodiment, although the cloud 2 is described as acting as a file server, if the cloud 2 provides computational resources, the cloud 2 may be requested to process a module which is not installed on the image processing apparatus 1 which may be operated in association with the cloud 2.

The service processing unit 18 processes services to be executed in the image processing apparatus 1. More specifically, the service processing unit 18 executes all or some of services to be executed among requested services using a module installed on the image processing apparatus 1.

The elements 11 to 18 in the image processing apparatus 1 are implemented through cooperation between the computer in the image processing apparatus 1 and a program operating in the CPU 21 in the computer. The information storing unit 19 is implemented by the HDD 28 in the image processing apparatus 1. In addition, the information storing unit 19 may be implemented by plural of HDDs 28. Alternatively, instead of being placed within the image processing apparatus 1, the information storing unit 19 may be installed on a computer accessible via a network and may be accessed.

Programs used in this exemplary embodiment may be provided through a communication means or may be provided stored in a computer readable recording medium such as a CD-ROM, a DVD-ROM or the like. The programs provided through the communication means or as the recording medium are installed in the computer and various processes are implemented when the CPU of the computer executes the installed programs in a sequence.

FIG. 4 is a view showing an exemplary data configuration of service configuration information according to this exemplary embodiment. For each service, the service configuration information is configured in association of a service name, which is information to identify the service, with a module used for processing the service. In this exemplary embodiment, for each service, the information is managed in the form of a table so that a sequence of module executions may also be managed. In this management table, a position corresponding to a module which is not used by a service is indicated by the symbol "-." With the exemplary data configuration shown in FIG. 4, for example, the module A is required to process a service SV1. Modules C, E and F are required to process a service SV4 and are executed in the order of C→F→E. The service configuration information is set before this exemplary embodiment is operated.

FIG. 5 is a view showing an exemplary data configuration of processing ability management information according to this exemplary embodiment. For each image processing apparatus in a group of image processing apparatuses which may be operated in association, the processing ability management information is configured in association with information ("α," "β," "γ" and "δ" in FIG. 5) to identify a corresponding image processing apparatus, empty capacity [MB] of the HDD 28 (or the RAM 27) in the image processing apparatus, index data indicating processing ability, and a module name as information to identify modules which are installed on the image processing apparatus. A case where no module is installed on an image processing apparatus is indicated by the symbol "-." There may be plural of modules installed on each image processing apparatus. In the processing ability management information, initial values of the empty capacity and the processing ability are preset in the respective image processing apparatuses based on specification of the HDD 28 and CPU 21 and modules downloaded in advance are preset in the installed module. As will be described later, the above-described preset values are updated depending on the use conditions of the respective image processing apparatuses.

FIG. 6 is a view showing an exemplary data configuration of module management information according to this exemplary embodiment. For each module, the module management information is configured in association with a module name as information to identify the modules, a program capacity to indicate the size of the modules, an amount of computation to indicate the quantity of computation, a load destination image processing apparatus to identify the image processing apparatuses which are loaded with the modules and become download request destinations, and storage destination information to specify the locations in which the modules are stored. Among these, the load destination image processing apparatus is not identification information of an image processing apparatus in which a corresponding module is actually loaded, but information to identify an image processing apparatus which becomes a download request destination of the module as described above. However, this information is set to be single identification information. Of course, if plural of image processing apparatuses is prepared as download request destinations, plural of identification information may be set for the plurality of image processing apparatuses. The storage destination information corresponds to a designated uniform resource locator (URL) in this exemplary embodiment and a location specified by this URL is a storage location of a corresponding module in the load destination image processing apparatus. In the load destination image processing apparatus, a case where there exists no image processing apparatus which becomes a download request destination is indicated by the symbol "-." Accordingly, a URL which has no load destination image processing apparatus and is set in the storage destination information is information to specify the storage destination of a corresponding module in a server included in the cloud 2. That is, this information means that the cloud 2 is designated as the download destination of the corresponding module. In the module management information, the program capacity and the amount of computation are preset information. In the load destination image processing apparatus, if a module is downloaded in advance and may be designated as a download request destination, identification information of the image processing apparatus is preset. In the storage destination information, a URL of a corresponding module in the cloud 2 or the image processing apparatus is preset. Moreover, as described below, the load destination image processing apparatus and the storage destination information are information which may be updated as the corresponding module is downloaded.

FIG. 7 is a view showing an exemplary data configuration of execution cost information according to this exemplary embodiment. For each image processing apparatus in a group of image processing apparatuses which may be operated in association, in the execution cost information, a percentage of processing time when modules ("A," "B" and "C" in FIG. 7) are executed in the corresponding image processing apparatuses ("α," "β," "γ" and "δ" in FIG. 7) is preset as an execution cost. Alternatively, the execution cost may be calculated by acquiring the computational amount data of each module by referring to a module computational amount for each module in the module management information shown in FIG. 6, acquiring processing ability data related to processing ability of the image processing apparatuses having respective modules by referring to the processing ability management information shown in FIG. 5, and dividing the computational amount data by the processing ability data.

FIG. 8 is a view showing an exemplary data configuration of communication cost information according to this exemplary embodiment. For each image processing apparatus in a group of image processing apparatuses which may be operated in association, in the communication cost information, values normalized to the maximum value of the data communication speed of a network connecting between image processing apparatuses ("α," "β," "γ" and "γ" in FIG. 7) is preset as a communication cost. The data communication speed may be set with measured values obtained through a data communication test without having to be set to preset fixed values.

Next, the operation of this exemplary embodiment will be described. First, a process of executing a service in this exemplary embodiment will be described with reference to a flow chart shown in FIG. 9.

When a service processing request is received by the service processing request receiving unit 11 in the image processing apparatus 1 (Step 101), the processing request destination determining unit 13 acquires the service configuration information shown in FIG. 4 from the information managing unit 12 in order to recognize a module required to process the received service (Step 102).

Subsequently, the processing request destination determining unit 13 acquires from the information managing unit 12 the module identification information to identify modules installed on the image processing apparatus 1 and the image processing apparatus 6 which may be operated in association with the image processing apparatus 1. More specifically, this unit 13 acquires the module identification information set in the "installed module" shown in FIG. 5. Then, by comparing the acquired module identification with the service configuration information, it is determined whether or not there is a module deficient in processing the service in the image processing apparatus 1 which received the service, that is, there is a module which is not installed on the image processing apparatus 1 among the modules used to process the received service.

If it is determined that a module which is not installed (hereinafter referred to as a "deficient module") is not present (N in Step 103), since all of the modules used to process the received service are installed on the image processing apparatus 1 and the image processing apparatus 1 does need not to newly download a module from cloud 2, the processing request destination determining unit 13 specifies the execution request destination of the service processing as the image processing apparatus 1, that is, its own apparatus. The service processing unit 18 executes the received service processing for itself (Step 111).

On the other hand, if it is determined that the deficient module is present (Y in Step 103), the module placing unit 16 specifies a module which is installed on each image processing apparatus by referring to the identification information (the information set as "installed module" shown in FIG. 5) of the modules installed on the image processing apparatus 6 other than the image processing apparatus 1 which receives the service request (Step 104).

If a deficient module is installed on the image processing apparatus 6 (Y in Step 105), the processing request destination determining unit 13 specifies an execution request destination of the module as the image processing apparatus 6 during service processing. As a result, the image processing apparatus 1 executes a service processing in association with the image processing apparatus 6 (Step 111).

If no deficient module is installed on the image processing apparatus 6 (N in Step 105), the processing cost calculating unit 15 calculates a processing time-related execution cost when modules constituting a corresponding service by adding modules installed on the image processing apparatus 1 and the image processing apparatus 6 shown in the module identification information and the deficient modules to be newly downloaded are sequentially processed, and a communication time-related communication cost when the result of the processing for each module is transmitted to an image processing apparatus on which modules to be processed next are installed, and calculates a processing cost by obtaining the sum of the execution cost and the communication cost (Step 106). Details of the calculation of the processing cost will be described later. Then, the module placing unit 16 selects the image processing apparatus, which corresponds to a deficient module placing destination when the processing cost becomes minimal, as the installation destination of the deficient module (Step 107).

Subsequently, according to an instruction from the module placing unit 16, the apparatus association operation control unit 14 requests the image processing apparatus 6 determined as the deficient module installation destination to download and use the deficient module stored in the storage destination specified by the storage destination information of the module management information shown in FIG. 6 (Step 108). Accordingly, the processing request destination determining unit 13 specifies the image processing apparatus 6 as an execution request destination of the module.

Thus, when a deficient module is installed on the image processing apparatus 6, the module placing unit 16 instructs the information to register the identification information of the installed module with the installed module corresponding to the image processing apparatus 6 in the processing ability management information shown in FIG. 5 (Step 109) by instructing to the information managing unit 12, register the identification information of the image processing apparatus 6 with the installation destination image processing apparatus of the module management information shown in FIG. 6, and register a URL specifying a location storing a deficient module with the storage destination information (Step 110).

Steps 109 and 110 may be carried out in a reverse order. In addition, since it may be considered that Step 110 cannot download a module program stored in an image processing apparatus to another image processing apparatus in consideration of licenses, information is not registered with the installation destination image processing apparatus of the module management information and the storage destination information in order to download a corresponding module from the cloud 2 at all times.

Thus, when a processing execution destination of a module to process a received service is determined, the image processing apparatus 1 executes a service processing in association with the image processing apparatus 6 (Step 111).

Now, the calculation of the processing cost will be described in more detail. This description corresponds to the detailed description of the processing of Step 107 in FIG. 9.

Figure 9:
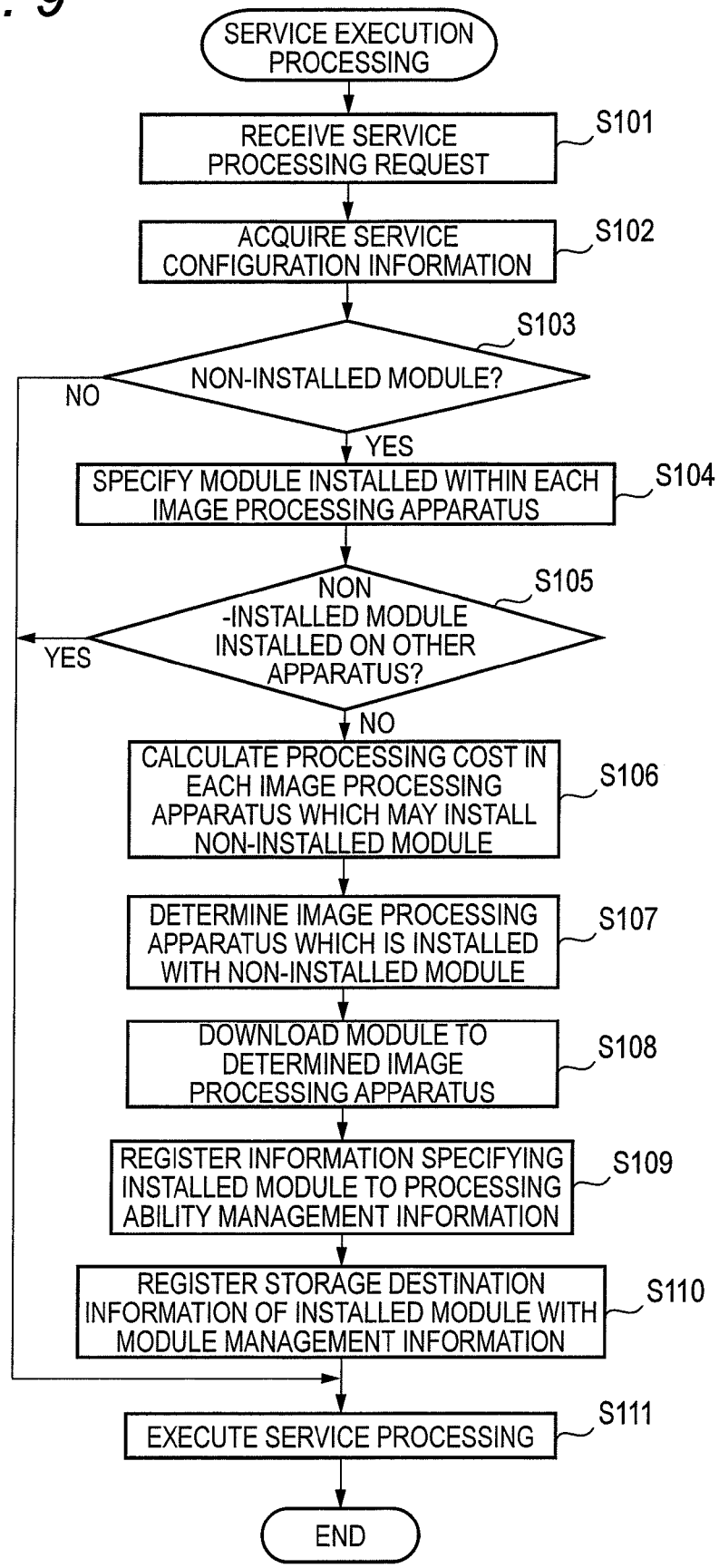
FIG. 9 is a flow chart showing a process of executing a service according to the first exemplary embodiment.
Figure 10:
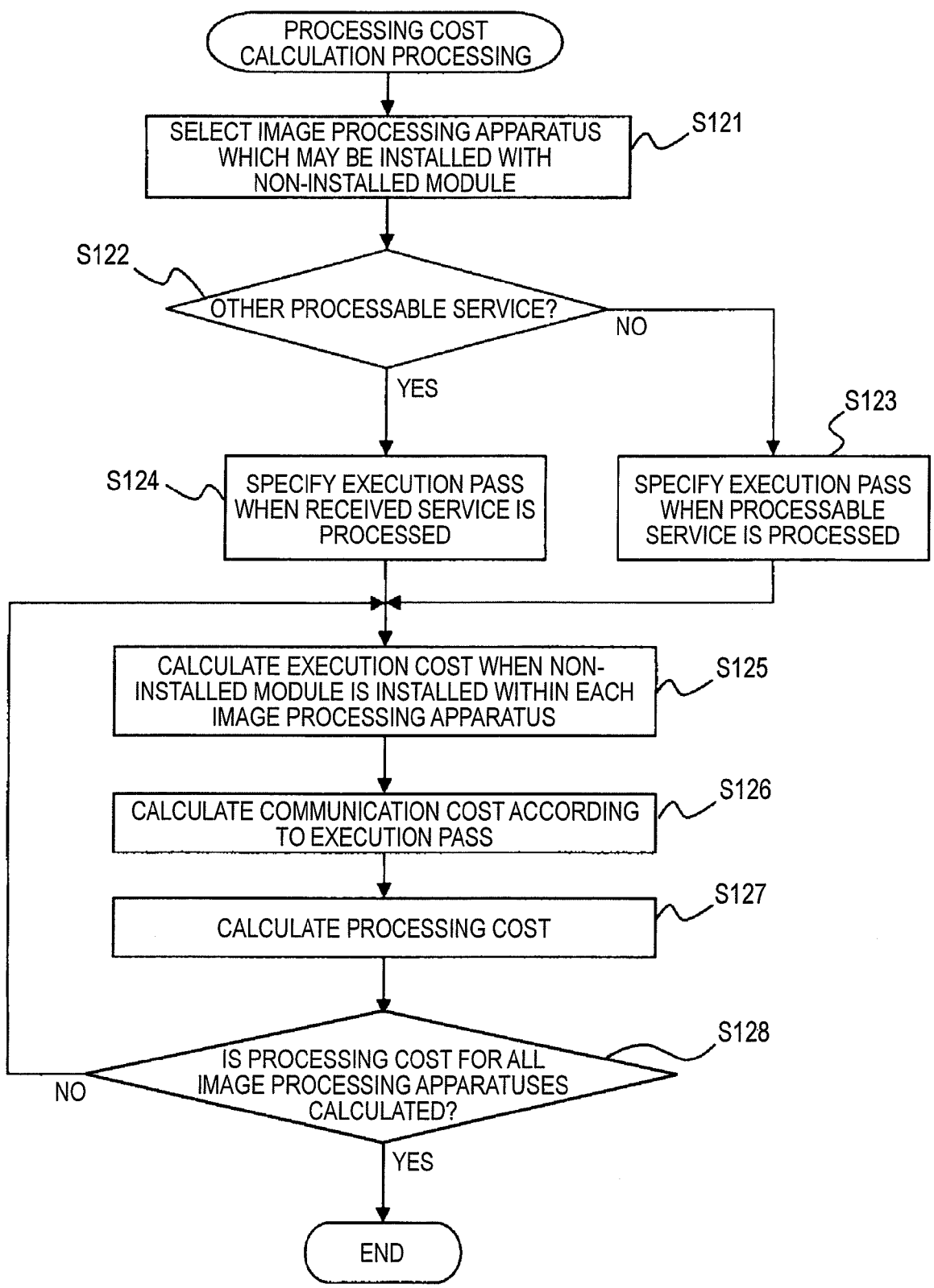
FIG. 10 is a flow chart showing a process of calculating a process cost according to the first exemplary embodiment.

FIG. 10 is a flow chart showing a process of calculating a process cost in the processing cost calculating unit 15. This process corresponds to the detailed process of Step 106 in FIG. 9.

First, the processing cost calculating unit 15 selects a download destination candidate by checking whether or not the HDD 28 has an empty capacity to conserve a downloaded deficient module by referring to the processing ability management information for the image processing apparatus 6 operable in association other than the image processing apparatus 1 which receives a service request (Step 121).

Next, by referring to the service configuration information illustrated in FIG. 4, the processing cost calculating unit 15 determines whether or not there exists an additional service which may be processed without downloading a different module by adding modules installed on the image processing apparatus 1 receiving the service request and the image processing apparatus 6 which may be operated in association with the image processing apparatus 1 and a deficient module to be newly downloaded.

If there exists a processable service in addition to the received service (Y in Step 122), the processing cost calculating unit 15 specifies an execution order of modules required to process the processable service by further referring to the service configuration information. In addition, by referring to the processing ability management information shown in FIG. 5, the processing cost calculating unit 15 specifies, for each download destination candidate of a deficient module, an execution pass to indicate that a processing result of each module flows between image processing apparatuses in what order when the processable service is processed (Step 123).

On the other hand, if a processable service is not present (N in Step 122), the processing cost calculating unit 15 specifies, for each download destination candidate of a deficient module, an execution pass to indicate that a processing result of each module flows between image processing apparatuses in what order when the service received by the service processing request receiving unit 11 is processed (Step 124).

In Step 122, although it may be considered that plural of processable service exists, a range of services may be narrowed to specify an execution pass for only services having many execution requests in Step 123 by acquiring request history information of each service. Even if the service request history information cannot be acquired, an execution pass may be specified for only services having a number of required modules, for example. As will be described later, the request history information may be generated by conserving processing history of the service received and processed by the service processing request receiving unit 11, such as, for example, identification information of the processed service, a service processing requester, a processing initiation date, time taken for processing, and the like.

Next, the processing cost calculating unit 15 calculates an execution cost of a module which is installed on each of the image processing apparatuses 6 operable in association and required to process the service (Step 125). In an image processing apparatus which handles image data, an execution cost generally depends on an image attribute such as the number and size of pixels of the image data, the number of gray scales per pixel, and the like. On the other hand, a communication cost depends on an amount of the image data. The data amount and the image attribute may be varied depending on contents of an image processing executed by a module. An image processing apparatus such as a multifunction copier has three kinds of image data handled, i.e., color, gray scale and monochrome binary value and their bit number and channel number (color component number) per one pixel are fixed. Paying attention to this, in order to cope with a case where an execution cost becomes nonlinear with respect to size of the image data as the image attribute is changed, which requires unique calculation, a function to execute cost calculation with the size of the image data preset as a parameter may be prepared for each kind of the image data handled by the image processing apparatus.

FIGS. 11A and 11B are views showing management tables which manage a prepared execution cost calculation function for each kind of image data. Here, the prepared execution cost calculation function may be an approximation function obtained by experiments or may be obtained by managing plural of discrete values obtained by experiments as a table and obtaining a median value using interpolation.

Next, according to an execution pass specified by Step 123 or Step 124, the processing cost calculating unit 15 calculates each a data communication time-related communication cost when a result of processing of each module is transmitted to the image processing apparatus on which a module to execute the next processing (Step 126) is installed. If data communication capability of a network is specified, the communication cost may increase in proportion to size of data exchanged between image processing apparatuses. Therefore, communication cost information may be prepared as the management table as shown in FIG. 8.

Thus, after calculating the execution cost and the communication cost, the processing cost calculating unit 15 obtains a processing cost by adding the execution cost and the communication cost (Step 127). Then, the processing cost calculating unit 15 obtains the processing cost for the entire download destination candidate range narrowed in Step 121 (Step 128).

In this manner, in this exemplary embodiment, a processing cost is calculated for the entire download destination candidates. Once the processing cost is calculated for all of the download destination candidates, the module placing unit 16 determines the image processing apparatus having the minimal processing cost among the download destination candidates as an installation destination of a corresponding deficient module, as described above.

Next, detailed operation of the above-described image processing apparatus 1 in this exemplary embodiment will be described with reference to FIG. 12.

Figure 12:
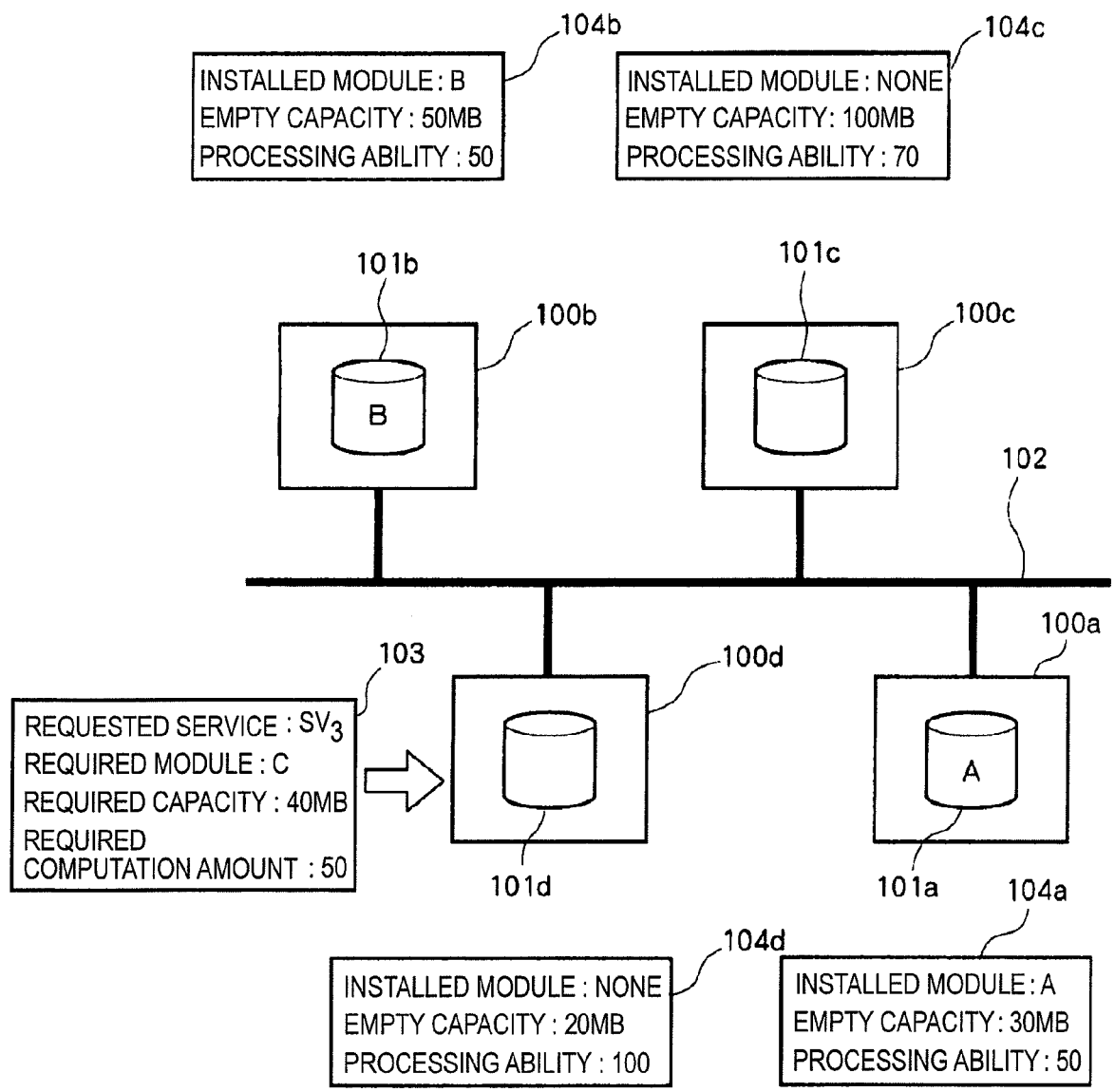
FIG. 12 is a conceptual view showing conditions of image processing apparatuses at the point of time when a service processing execution request is received according to the first exemplary embodiment.

FIG. 12 is a conceptual view showing conditions of image processing apparatuses at the point of time when a service processing execution request is received. In FIG. 12, image processing apparatuses 100*a*, 100*b*, 100*c* and 100*d* constituting an image processing apparatus group (hereinafter, unless particularly otherwise stated, if the management tables of FIGS. 5 to 8 are referred to, it is assumed that the image processing apparatuses 100*a*, 100*b*, 100*c* and 100*d* correspond to α, β, γ and δ, respectively.) each have the same elements as the image processing apparatus 1 in this exemplary embodiment shown in FIG. 3 and may be connected to a network 102 such as, for example, an internet, and execute a series of data processing in association. Contents common to all of the image processing apparatuses 100*a*, 100*b*, 100*c* and 100*d* will be described with "image processing apparatus 100". Other elements will be similarly denoted.

The image processing apparatus 100 is equipped with respective storage means 101*a*, 101*b*, 101*c* and 101*d* constituted by the HDD 28 or the like to store a module externally downloaded to execute a service processing if necessary. This storage means corresponds to the information storage unit 19 shown in FIG. 3.

Although processing ability management information 104*a*, 104*b*, 104*c* and 104*d*, such as type of modules installed on the image processing apparatus 100, empty capacity of the storage means, internal CPU processing ability, and the like, is information which may be managed within the image processing apparatus, this processing ability management information 104*a*, 104*b*, 104*c* and 104*d* may be unitarily managed on an external management server (not shown) as the image processing apparatus 100 transmits the processing ability management information 104 to the management server. The processing ability management information management table shown in FIG. 5 shows one suitable example of such unitary management.

In this example, it is assumed that a service request 103 to request the image processing apparatus 100*d* to process a service SV3 is made (Step 101). In order to specify a type of module required to process the service SV3, the image processing apparatus 100*d* requests an external management server (not shown) to inquire the service configuration information shown in FIG. 4. In addition, the image processing apparatus 100*d* may request transmission of the service configuration information and acquire it (Step 102). With reference to the setting example shown in FIG. 4, it is determined that the module C is required to process the service SV3. In addition, the image processing apparatus 100*d* requests the management server to refer to the module management information shown in FIG. 6. In addition, the image processing apparatus 100*d* may request transmission of the module management information and acquire it.

With reference to the setting example of the module management information shown in FIG. 6, it is determined that the module C has a required program capacity of 40 Megabytes and a required amount of computation of "50" units and it is determined that a URL to be accessed when the module C is downloaded is http://5.6.7.8/optional/. In addition, such module management information may be transmitted to an image processing apparatus to request a service, along with the service request 103.

The image processing apparatus 100*d* confirms that the module C required to process the service SV3 is not installed on its own apparatus by referring to the installed module of the processing ability management information 104*d* (Step 103). In addition, the image processing apparatus 100*d* requests other image processing apparatuses 100*a*, 100*b* and 100*c* to transmit their respective processing ability management information 104*a*, 104*b* and 104*c*. In addition, if a management server (not shown) unitarily manages all of the processing ability management information of the image processing apparatus 100 operable in association, the image processing apparatus 100*d* may request the management server to inquire the processing ability management information of the other image processing apparatuses 100*a*, 100*b* and 100*c* which are installed on the module C. In addition, the image processing apparatus 100*d* may request transmission of the processing ability management information and acquire it (Step 104). In this example, by referring to one of the processing ability management table shown in FIG. 5 and the processing ability management information 104*a*, 104*b* and 104*c* of the other image processing apparatuses, it is determined that no module C is installed (N in Step 105).

Therefore, in order to specify that the module C is placed in which image processing apparatus 100, the image processing apparatus 100*d* specifies an image processing apparatus having an empty capacity of equal to or more than 40 Megabytes of the program capacity of the module C as a download destination candidate by referring to the processing ability management information 104*a*, 104*b* and 104*c* of the other image processing apparatuses. In this case, the image processing apparatuses 100*b* and 100*c* become download destination candidates.

In this example, considering that the number of download destination candidates is not narrowed to one, next, the image processing apparatus 100*d* specifies whether or not there exist other services using the module C by referring to the service configuration information shown in FIG. 4. In this example, with reference to FIG. 4, it is determined that the service SV2 and the service SV4 in addition to the service SV3 exist as services using the module C. However, since the service SV4 requires a module E and a module F which are not installed on the image processing apparatuses 100*a*, 100*b*, 100*c* and 100*d*, in this example, a processing cost of the service SV2 will be evaluated with considering this service SV4. In this manner, a calculation object of processing load may be narrowed to the service SV2 among the services SV2, SV3 and SV4 extracted depending on conditions of modules installed on the image processing apparatus 100.

With reference to the service configuration information shown in FIG. 4, it may be seen that the service SV2 is executed in an order of module A→module B→module C. Accordingly, if the image processing apparatus 100*d* is requested to process the service SV2, the image processing apparatus 100*d* first sends data to be processed for the service SV2 to the image processing apparatus 100*a* on which the module A is installed, and then the image processing apparatus 100*a* starts the module A to process the received data and sends the processed data to the image processing apparatus 100*b* on which the module B is installed. Under these conditions, a processing cost is calculated (Step 106).

The processing cost up to here is calculated as follows by referring to the execution cost information shown in FIG. 7. Here, execution costs of any modules m installed on the image processing apparatuses 100*a*, 100*b*, 100*c* and 100*d* are denoted by PC($\alpha$, m), PC($\beta$, m), PC($\gamma$, m) and PC($\delta$, m), respectively. In addition, a communication cost generated when any image processing apparatus s communicates with another image processing apparatus t is denoted by CC(s, t).

(1) Execution Cost and Communication Cost Related to Module A

When data to be first processed for the service SV2 are sent to the image processing apparatus 100*a*, a communication cost CC($\delta$, $\alpha$) is generated and CC($\delta$, $\alpha$)=1 is obtained by referring to a column 81 in FIG. 8. For an execution cost PC($\alpha$, A) related to the module A, PC($\alpha$, A)=1.0 is obtained by referring to a column 71 of the image processing apparatus 100*a* (corresponding to the image processing apparatus $\alpha$ in FIG. 7) on which the module A is installed in FIG. 7.

As a result of the processing by the module A is sent from the image processing apparatus 100*a* to the image processing apparatus 100*b*, for a communication cost CC($\alpha$, $\delta$) at that time, CC($\alpha$, $\delta$)=1 is obtained by referring to a column 82 in FIG. 8. In addition, in that the image processing apparatus 100*a* with the processing ability of "50" processes data of the computation amount of "50," the execution cost PC($\alpha$, A) may be calculated as (computation amount=50)/(processing ability=50)=1.0 by referring to the processing ability management information 104*a* of the image processing apparatus 100*a* as the processing ability management information as shown in FIG. 5.

(2) Execution Cost and Communication Cost Related to Module B

For an execution cost PC($\beta$, B) related to the module B, the execution cost=1.0 is obtained by referring to a column 72 of the image processing apparatus 100*b* (corresponding to the image processing apparatus $\beta$ in FIG. 7) on which the module B is installed in FIG. 7. As described above, the execution cost PC($\beta$, B) may be calculated as (computation amount=50)/(processing ability=50 of image processing apparatus 100*b*)= 1.0.

Next, a processing by the module C is executed. Since a download destination candidate of the module C is one of the image processing apparatuses 100*b* and 100*c*, a processing cost is calculated when the module C for each apparatus is downloaded.

(3) Execution Cost and Communication Cost when Module C is Downloaded to Image Processing Apparatus $\beta$ When the module C is downloaded to the image processing apparatus 100*b*, since a processing of the module B is performed by the same image processing apparatus 100*b*, a communication cost required to transmit a result of the processing of the module B to an image processing apparatus on which the module C is installed is not generated.

For an execution cost PC($\beta$, C) related to the module C, the execution cost PC($\beta$, C)=1.0 is obtained by referring to a column 73 in FIG. 7. In that the image processing apparatus 100*b* with the processing ability of "50" processes data of the computation amount of "50," the execution cost PC($\beta$, C) may be calculated as (computation amount=50)/(processing ability=50)=1.0 by referring to the processing ability management information as shown in FIG. 5.

In addition, since a result of the processing by the module C needs to be returned to the image processing apparatus 100*d*, a communication cost CC($\beta$, $\delta$)=1 is obtained by referring to a column 83 in FIG. 8.

(4) Execution Cost and Communication Cost when Module C is Downloaded to Image Processing Apparatus $\gamma$ When the module C is downloaded to the image processing apparatus 100*c*, since a result of the processing by the module B needs to be sent from the image processing apparatus 100*b* to the image processing apparatus 100*c*, a communication cost CC($\beta$, $\gamma$)=1 is obtained by referring to a column 84 of the communication cost information in FIG. 8.

For an execution cost of the module C in the image processing apparatus 100*c*, the execution cost PC($\gamma$, C)=0.7 is obtained by referring to a column 74 of the execution cost information shown in FIG. 7. In that the image processing apparatus 100*c* with the processing ability of "70" processes data of the computation amount of "50," the execution cost PC($\gamma$, C) may be calculated as (computation amount=50)/ (processing ability=70)=0.7 by referring to the processing ability management information as shown in FIG. 5.

In addition, since a result of the processing by the module C needs to be returned to the image processing apparatus 100*d*, a communication cost CC($\gamma$, $\delta$)=1 is obtained by referring to a column 85 of the communication cost information shown in FIG. 8.

For each download destination of the module C, a processing cost is obtained as follows by adding the execution cost and the communication cost.

(5) Processing Cost when Module C is Downloaded to Image Processing Apparatus $\beta$ When a download destination of the module C is the image processing apparatus 100*b*, a processing cost is CC($\delta$, $\alpha$)+ PC($\alpha$, A)+CC($\alpha$, $\beta$)+PC($\beta$, B)+PC($\beta$, c)+CC($\beta$,$\delta$)=1+1+1+ 1+1+1=6.0.

(6) Processing Cost when Module C is Downloaded to Image Processing Apparatus $\gamma$ When a download destination of the module C is the image processing apparatus 100*c*, a processing cost is CC($\delta$, $\alpha$)+ PC($\alpha$, A)+CC($\alpha$, $\beta$)+PC($\beta$, B)+CC($\beta$, $\gamma$)+PC($\gamma$, C)+CC($\gamma$,$\delta$)= 1+1+1+1+1+0.7+1=6.7.

From the above result, since it is apparent that a processing cost when the module C is placed in the image processing apparatus 100*b* is smaller than a processing cost when the module C is placed in the image processing apparatus 100*c*, a placement destination of the module C is determined as the image processing apparatus 100*b*.

Figure 13:
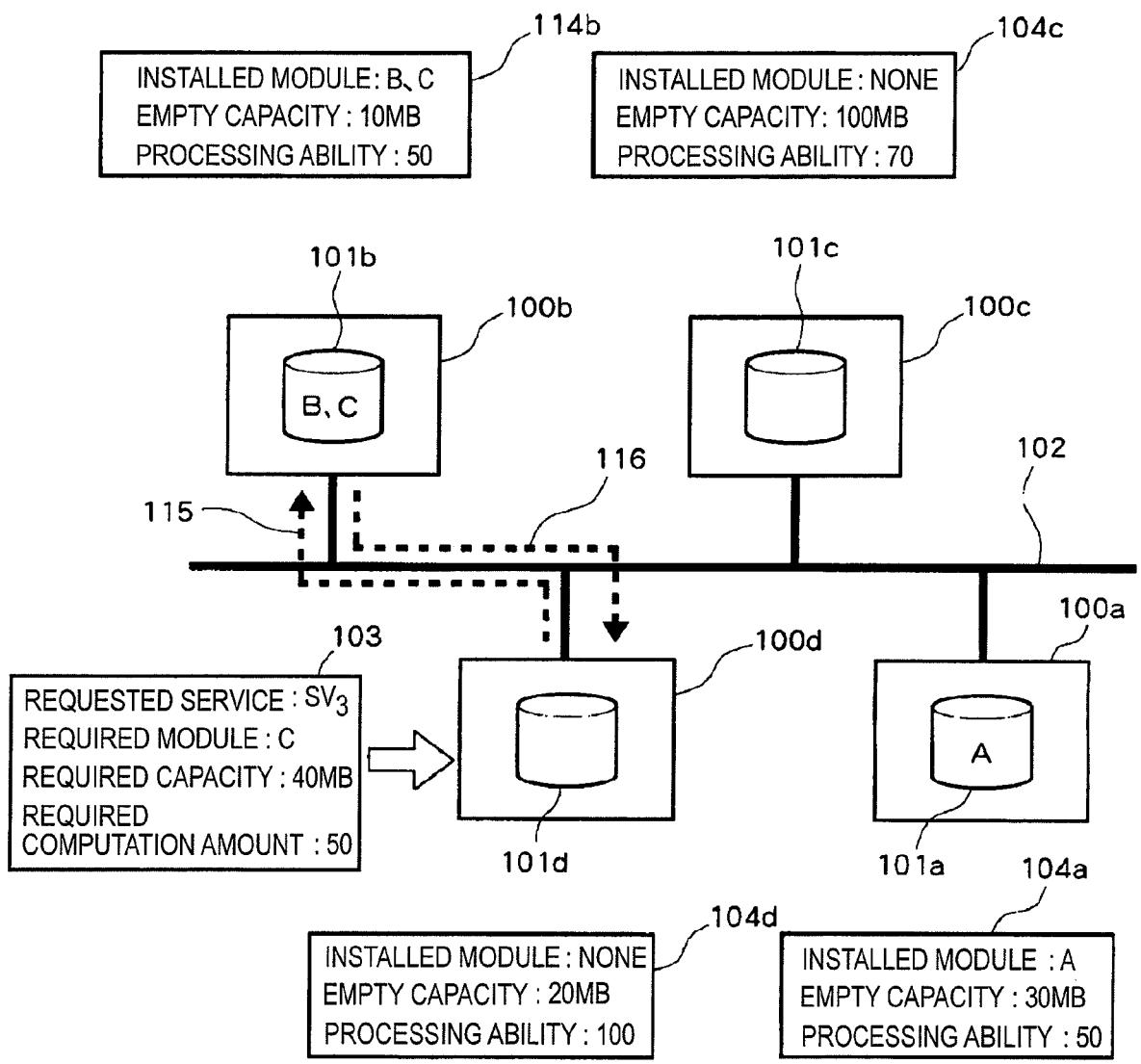
FIG. 13 is a conceptual view showing conditions of image processing apparatuses at the point of time when a module required to receive and process a service request is downloaded from the conditions shown in FIG. 12.

FIG. 13 is a conceptual view showing conditions of image processing apparatuses at the point of time when a module required to receive and process a service request is downloaded from the conditions shown in FIG. 12.

As described above, since the module C required to process the service SV3 is placed in the image processing apparatus 100*b*, the module C in addition to the module B is registered with the installed module in the processing ability management information stored in the storage means 111*b* of the image processing apparatus 100*b*. In addition, since an empty capacity in the storage means 111*b* is 10 megabytes which corresponds to a subtraction of the program capacity of the module C from the initial 50 megabytes, an empty capacity in the processing ability management information is updated from 50 megabytes to 10 megabytes in response to this.

The above-described process is to place the module C considering that the image processing apparatus 100*d* is requested to process the service SV3 using the module C and accordingly receives a future service processing request, specifically a request of the service SV2 using the module C in the future. However, here, since the image processing apparatus 100*d* receives an execution request of the processing of the service SV3, the image processing apparatus 100*d* requested to process the service SV3 requests the image processing apparatus 100*b* to process the service SV3 and delivers data to be processed for the service SV3 to the image processing apparatus 100*b* (a path 115 in FIG. 13). Then, the image processing apparatus 100*b* processes the service SV3 using the delivered data and returns a result of the processing to the image processing apparatus 100*d* when the processing is ended (a path 116).

As can be seen from the above description, this exemplary embodiment calculates a processing cost by referring to the service configuration information (FIG. 4) to specify a module used to process any service, the processing ability management information (FIG. 5) indicating installed modules, CPU processing ability and the like of image processing apparatuses which may be operated in association, and the module management information (FIG. 6) including program capacity and computation amount of each module, storage destination information, and the like. Although this information may be managed by each image processing apparatus, they may be unitarily managed by a separate management server. Even when a new service may be processed by adding a new module, each image processing apparatus may know the addition of the new service to the service processing system if only the information maintained and managed by the management server is updated. In addition, a provider to provide the new module or the new service may be involved in reduction of a communication cost when each image processing apparatus is informed of such addition.

Second Exemplary Embodiment

Figure 14:
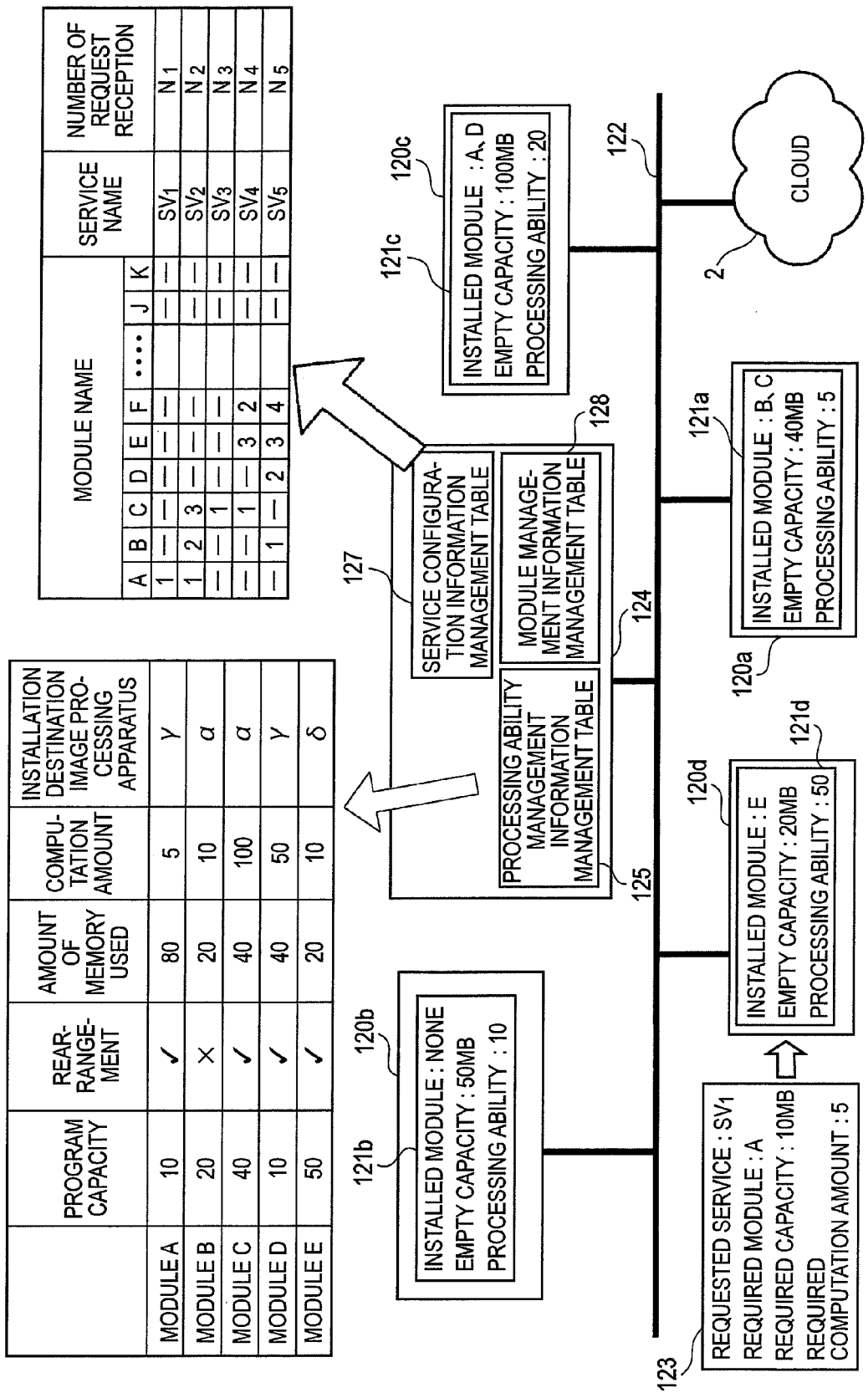
FIG. 14 is a view showing a general configuration of a service processing system according to a second exemplary embodiment.

This exemplary embodiment provides a service processing system including the management server described in the first exemplary embodiment. FIG. 14 is a view showing a general configuration of a service processing system according to the second exemplary embodiment, showing the concept used to explain a relationship between plural of image processing apparatuses which may be operated in association and a management server.

Hereinafter, operation of this exemplary embodiment will be described. Each image processing apparatus may be configured as shown in FIG. 3. In addition, a variety of information stored in the information storage unit 19 may be unitarily managed by a management server 124.

Image processing apparatuses 120*a*, 120*b*, 120*c* and 120*d* which are connected to a network 122 and may be operated in association transmit processing ability management information 121*a*, 121*b*, 121*c* and 121*d* stored therein to the management server 124, for example at a timing at which an installed module or an empty capacity of a storage means is changed. The management server 124 has an information managing unit to manage various definitions, which will be described later, and intensively manages the processing ability management information 121 of the image processing apparatuses 120 using a processing ability management definition management table 125 managed by the management server 124. If receiving the processing ability management, the management server 124 may receive the processing ability management information 121 from each image processing apparatus 120 every a period.

If the cloud 2 stores plural of modules which may be used when these modules are downloaded to the image processing apparatuses 120*a*, 120*b*, 120*c* and 120*d*, module management information is maintained on the cloud 2. The management server 124 receives the module management information from the cloud 2 and intensively manages the received information in a module management information management table 128.

Service configuration information indicating a service which may be processed by using the modules stored in the cloud 2 is intensively managed in a service configuration information management table 127 managed by the management server 124. In addition, information managed in the service configuration information management table 127 may be properly delivered by the management server 124 to the image processing apparatuses 120*a*, 120*b*, 120*c* and 120*d* in order to limit the frequency of access of the information to the management server 124.

The image processing apparatuses 120*a*, 120*b*, 120*c* and 120*d* may generate and manage history information such as a type, number of receptions and the like of services which receive a request. When these image processing apparatuses communicate with the management server 124, by transmitting the history information of the service processing request together, the management server 124 may unitarily manage a service request history for the entire image processing apparatuses, which may be operated in association, on the managed service configuration information management table 127. Upon receiving history information related to a performed service from each image processing apparatus 120, the management server 124 registers and manages this history information with "request reception number" of the service in the service configuration information management table 127.

A "rearrangement" in the processing ability management information management table 125 will be described below in a third exemplary embodiment.

Third Exemplary Embodiment

In the above first exemplary embodiment, if a module required to process a requested service is not installed, the required module is downloaded and placed.

However, even when an image processing apparatus on which the required module is installed exists, there may be a case where a service requested to be processed from now cannot be immediately processed as the image processing apparatus already receives a different service request. In addition, there may be also a case where use of a module is limited in consideration of licensing agreement. In this case, there occurs a need to download the required module separately even when the required module is installed on plural of image processing apparatuses.

Accordingly, in this exemplary embodiment, even when a module required to process a service which receives a request is already installed on one of the plurality of image processing apparatuses which may be operated in association, if the module cannot be used to process the service which receives the request, the required module is separately downloaded to an image processing apparatus other than the image processing apparatus on which the module is installed to process the service.

This exemplary embodiment may be implemented with the system configuration shown in FIG. 14 and a configuration of the image processing apparatus may be as shown in FIG. 3.

Figure 15:
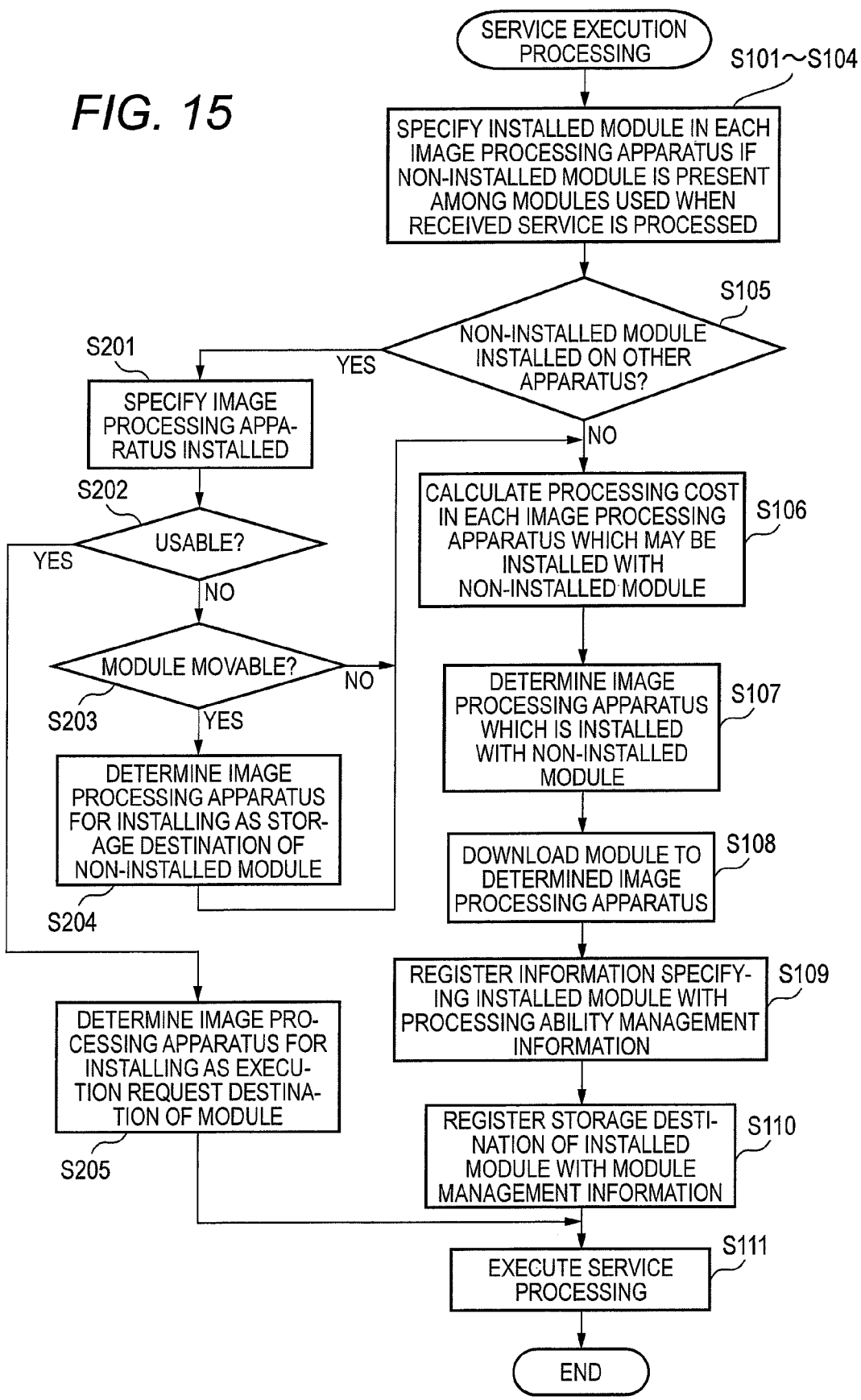
FIG. 15 is a flow chart showing a process of executing a service according to a third exemplary embodiment.

Hereinafter, operation of this exemplary embodiment will be described. In this exemplary embodiment, a service execution process is basically the same as the first exemplary embodiment and is according to a processing order of the flow chart shown in FIG. 9. However, if a deficient module is installed on the image processing apparatus 6 (Y in Step 105), the subsequent processes are different from those in the first exemplary embodiment. Hereinafter, processes after Step 105 will be described using a flow chart shown in FIG. 15. In FIG. 15, the same processes as FIG. 9 are denoted by the same reference numerals and explanation thereof will not be repeated.

If a deficient module is installed on one of image processing apparatuses which may be operated in association (Y in Step 105), the module placing unit 16 specifies an image processing apparatus on which the module is installed (Step 201). Subsequently, the module placing unit 16 determines whether or not the module may be used in the specified image processing apparatus. For this determination, it is checked whether or not the module may be used as this module is used to process a different service. Alternatively, the module placing unit 16 may inquire of the specified image processing apparatus about usability of the module. As another alternative, if the management server 124 manages status information indicating whether or not a module is used by an image processing apparatus, the module placing unit 16 may inquire of the management server 124 about usability of the module for the image processing apparatus. If the deficient module may be used (Y in Step 202), the processing request destination determining unit 13 determines the image processing apparatus as an execution request destination of the deficient module (Step 205). Then, the image processing apparatuses on which the respective modules are installed are associated to perform a service processing (Step 111).

On the other hand, if a deficient module cannot be used (N in Step 202), the module placing unit 16 checks whether or not the module may be rearranged in other image processing apparatuses. This is because, depending on a module type, module copying may be limited due to licensing agreement or the like or an image processing apparatus itself may have no function to copy an installed module into a storage means of other image processing apparatus. Alternatively, the module placing unit 16 may directly inquire of the specified image processing apparatus about usability of the module. As another alternative, if the management server 124 manages information of "rearrangement" in the processing ability management information management table 125 shown in FIG. 14, that is, module rearrangement, the module placing unit 16 may inquire of the management server 124 about usability of the module.

Consequently, if it is determined that the module may be rearranged in other image processing apparatuses (Y in Step 203), the module placing unit 16 determines the specified image processing apparatus as an acquisition destination of the module by updating storage destination information of the module included in the module management information shown in FIG. 6 to a URL of the specified image processing apparatus (Step 204). In this case, since Step 110 performs the same process as Step 204, the storage destination information may not be registered in Step 110. Description about which image processing apparatus has the module installed and processes until the service process and the like is executed (Step 106 to 111) will be omitted.

On the other hand, if the module cannot be rearranged in other image processing apparatuses (N in Step 203), it is determined that the module needs to be separately downloaded and the operation proceeds to Step 106. Description about processes after that (Step 106 to 111) will be omitted.

According to this exemplary embodiment, if a deficient module is installed on a different image processing apparatuses, the different image processing apparatus or another image processing apparatus is selected as an execution destination of the deficient module depending on conditions of the different image processing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A service processing apparatus comprising:
   a receiving unit that receives a service processing request;
   a first acquiring unit that acquires service configuration information including at least information identifying one or more modules to implement one or more processing functions required to process a requested service;
   a second acquiring unit that acquires processing ability management information including at least information identifying an installed module and information indicating processing ability for own service processing apparatus and each of one or more different service processing apparatuses which is operated in association with the own service processing apparatus when the service is processed;
   a processing unit that processes the service using the installed module;
   a selecting unit that selects service processing apparatuses on which is installed a module which is installed on neither the own service processing apparatus nor the different service processing apparatuses by referring to the processing ability management information if there exists a module which is installed on neither the own service processing apparatus nor the different service processing apparatuses among modules used when the requested service is processed by referring to the service configuration information;
   a determining unit that selects services using the module which is installed on neither the own service processing apparatus nor the different service processing apparatuses by referring to the service configuration information, narrowing a range of the selected services to a service which is a calculation object of a processing load depending on conditions of installation of the module used to process each of the selected services within the service processing apparatus and the different service processing apparatuses, that calculates a processing load when the module which is installed on neither the service processing apparatus nor the different service processing apparatuses is installed on each of the service processing apparatuses selected by the selecting unit when the narrowed service is processed, and that determines a service processing apparatus having the minimal processing load resulting from the calculation of the processing load as a request destination for a processing using the module which is installed on neither the service processing apparatus nor the different service processing apparatuses; and an installation unit that installs the module on the service processing apparatus determined by the determining unit if the module which is installed on neither the service processing apparatus nor the different service processing apparatuses is not installed on the determined service processing apparatus, and updates the processing ability management information by setting information identifying a module installed on the determined service processing apparatus.

2. The service processing apparatus according to claim 1, wherein, if a module which is not installed on the own service processing apparatus is installed on one of the different service processing apparatuses, the determining unit determines the different service processing apparatus on which the module is installed as a request destination for a processing using the module which is not installed on the own service processing apparatus.

3. The service processing apparatus according to claim 1, further comprising a third acquiring unit that acquires module management information including at least information specifying an acquisition destination of each module, wherein the installation unit acquires an installed module of the service processing apparatus determined by the determining unit from the acquisition destination specified by the module management information.

4. A service processing system comprising:
a plurality of service processing apparatuses;
a service configuration information storage device which stores service configuration information including at least information identifying one or more modules to implement one or more processing functions required to process a service; and
a processing ability management information storage device which stores processing ability management information including at least information identifying a module which is installed on each of the service processing apparatuses and information indicating processing ability for the service processing apparatus,
wherein each of the plurality of service processing apparatuses includes:
a receiving unit that receives a service processing request;
a first acquiring unit that acquires the service configuration information from the service configuration information storage device;
a second acquiring unit that acquires the processing ability management information from the processing ability management information storage device;
a processing unit that processes a requested service in association with different service processing apparatuses on which is installed a module which is used when the requested service is executed;
a selecting unit that selects service processing apparatuses on which a module is installed which is installed on neither of the service processing apparatuses by referring to the processing ability management information if there exist a module which is installed on neither of the service processing apparatuses among modules used when the requested service is processed by referring to the service configuration information;

a determining unit that selects services using the module which is installed on neither of the service processing apparatuses by referring to the service configuration information, narrowing a range of the selected services to a service which is a calculation object of a processing load depending on conditions of installation of the module used to process each of the selected services within the service processing apparatuses, that calculates a processing load when the module which is installed on neither of the service processing apparatuses is installed on each of the service processing apparatuses selected by the selecting unit when the narrowed service is processed, and determines a service processing apparatus having the minimal processing load resulting from the calculation of the processing load as a request destination for a processing using the module which is installed on neither of the service processing apparatuses; and an installation unit that installs the module within the service processing apparatus determined by the determining unit if the module which is installed on neither of the service processing apparatuses is not installed on the determined service processing apparatus, and updates the processing ability management information by setting information identifying a module installed on the determined service processing apparatus.

5. The service processing system according to claim 4, further comprising a management device which collectively reads and writes the information stored in the storage devices depending on a request from the service processing apparatuses.

6. A non-transitory computer readable medium storing a computer readable program executable by a computer for causing a computer installed on a service processing apparatus, the process comprising:
receiving a service processing request;
acquiring service configuration information including at least information identifying one or more modules to implement one or more processing functions required to process a requested service;
acquiring processing ability management information including at least information identifying an installed module and information indicating processing ability for own service processing apparatus and each of one or more different service processing apparatuses which is operated in association with the own service processing apparatus when the service is processed;
processing the service using the installed module;
selecting service processing apparatuses on which a module is installed which is installed on neither the own service processing apparatus nor the different service processing apparatuses by referring to the processing ability management information if there exist a module which is installed on neither the own service processing apparatus nor the different service processing apparatuses among modules used when the requested service is processed by referring to the service configuration information;
selecting services using the module which is installed on neither the own service processing apparatus nor the different service processing apparatuses by referring to the service configuration information, narrowing a range of the selected services to a service which is a calculation object of a processing load depending on conditions of installation of the module used to process each of the selected services within the own service processing apparatus and the different service processing apparatuses, calculating a processing load when the module which is installed on neither the own service processing apparatus nor the different service processing apparatuses is installed on each of the service processing apparatuses selected by the selecting when the narrowed service is processed, and determining a service processing apparatus having the minimal processing load resulting from the calculation of the processing load as a request destination for a processing using the module which is installed on neither the own service processing apparatus nor the different service processing apparatuses; and installing the module within the service processing apparatus determined by the determining if the module which is installed on neither the own service processing apparatus nor the different service processing apparatuses is not installed on the determined service processing apparatus, and updating the processing ability management information by setting information identifying a module installed on the determined service processing apparatus.

* * * * *